United States Patent [19]

Tendler

[11] Patent Number: 4,833,477

[45] Date of Patent: May 23, 1989

[54] EMERGENCY VESSEL LOCATION SYSTEM

[76] Inventor: Robert K. Tendler, 19 Lawrence Ave., Chestnut Hill, Mass. 02167

[21] Appl. No.: 275,660

[22] Filed: Nov. 22, 1988

Related U.S. Application Data

[63] Continuation of Ser. No. 85,238, Aug. 12, 1987, abandoned, which is a continuation of Ser. No. 736,636, May 21, 1985, abandoned.

[51] Int. Cl.$^4$ ................................................. G01S 1/24
[52] U.S. Cl. .................................... 342/389; 364/449; 340/996
[58] Field of Search ............................. 381/31, 41, 51; 340/692, 963, 966, 967, 996, 993; 364/424.01, 449, 461; 342/389, 410, 413, 455; 441/12

[56] References Cited

U.S. PATENT DOCUMENTS

| | | | |
|---|---|---|---|
| 3,573,819 | 4/1971 | Mason et al. | 342/46 |
| 3,840,877 | 10/1974 | Crane | 342/410 |
| 3,907,223 | 9/1975 | Crane | 342/413 |
| 4,135,143 | 1/1979 | Argentieri et al. | 340/692 |
| 4,234,924 | 11/1980 | LaVance et al. | 342/46 |
| 4,288,789 | 9/1981 | Molinick et al. | 340/692 |
| 4,383,241 | 5/1983 | Kojima et al. | 340/692 |
| 4,435,711 | 3/1984 | Ho et al. | 343/389 |
| 4,489,405 | 12/1984 | Tendler | 367/116 |
| 4,531,114 | 7/1985 | Topol et al. | 340/692 |
| 4,589,132 | 5/1986 | Botbol et al. | 381/51 |
| 4,616,350 | 10/1986 | Tendler | 367/116 |
| 4,621,348 | 11/1986 | Tendler | 367/116 |

*Primary Examiner*—Thomas H. Tarcza
*Assistant Examiner*—Tod Swann
*Attorney, Agent, or Firm*—Robert K. Tendler

[57] ABSTRACT

An omega, loran or satellite navigation receiver is provided with a speech synthesizer coupled to its latitude/longitude output which is in turn coupled to a transmitter which transmits the latitude and longitude along with a "mayday" indication on an emergency channel when an emergency button is depressed on the unit. The emergency button turns the power on for the navigation unit and bypasses all functions except those relating to the production of a lat./lon. signal. The emergency button also activates the synthesizer after determining that the navigation unit has obtained lock. Upon the obtaining of lock a repeat timer produces repeated dump pulses to the speech synthesizer which modulates the transmitter to transmit the "mayday" indication plus an indication of the latitude and longitude of the vessel. As an option, the vessel name, type and color may be entered into a memory for the speech synthesizer so that the identity of the vessel and its type and color may be ascertained. As an additional feature the unit is provided with a receiver tuned to a special channel utilized by the Coast Guard or other authorities to disable the transmitter remotely. A manual disable from within the vessel is also provided. In one embodiment the same antenna is utilized for the navigation unit, the transmitter and the receiver, whereas in another embodiment the navigation unit is placed in stand-by during the transmit cycle so that its latitude and longitude are not affected by the emergency transmission.

17 Claims, 1 Drawing Sheet

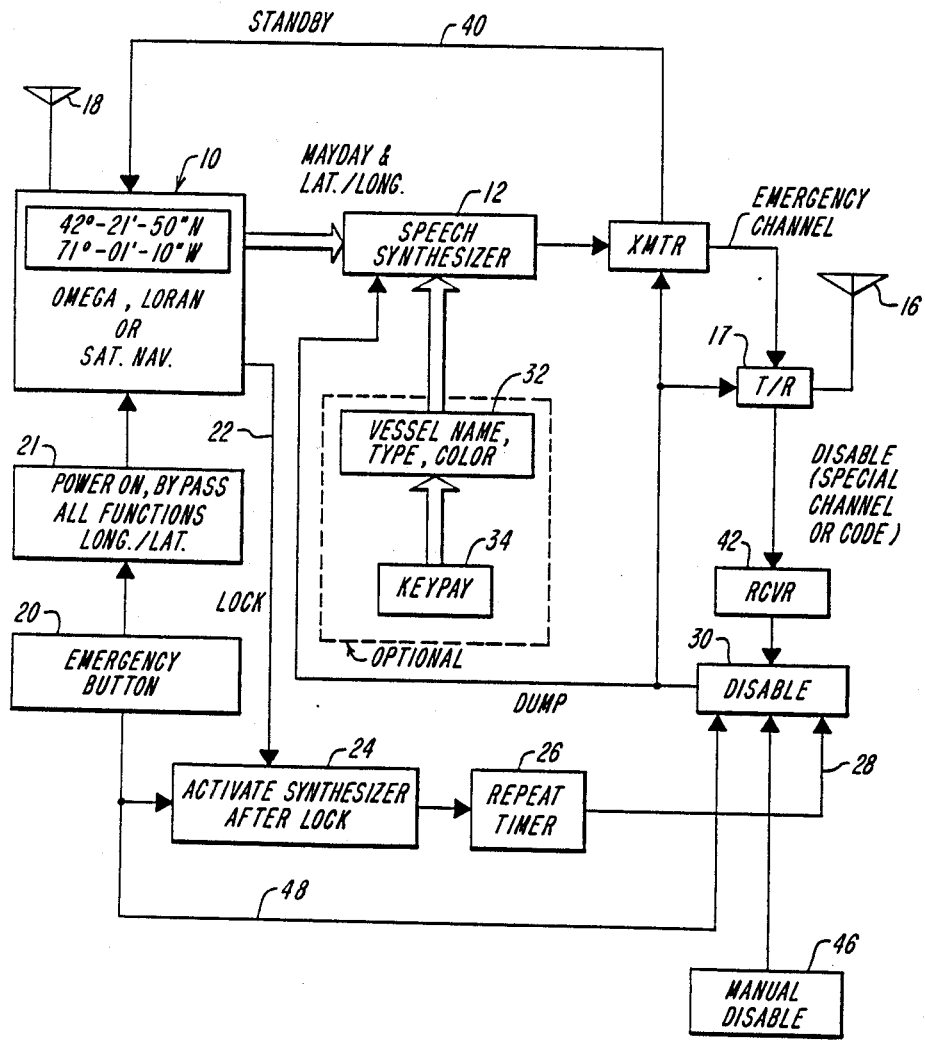

EMERGENCY VESSEL LOCATION SYSTEM

This is a continuation of application Ser. No. 085,238 filed Aug. 12, 1987, which is a continuation of application Ser. No. 736,636 filed May 21, 1985, now abandoned.

FIELD OF INVENTION

This invention relates to emergency locaters for vessels and more particularly to a system which automatically annunciates the latitude and longitude of a vessel in distress.

BACKGROUND OF THE INVENTION

Hyperbolic navigation systems such as loran and omega, as well as satellite navigation systems have been utilized to place the position of a vessel within plus or minus fifty feet in certain circumstances. While these units have operated separately quite satisfactorily to give the operator of a vessel an idea of his location, unless expert personnel are utilized in the operation of this equipment, due to its complexity it is almost impossible in an emergency situation to instruct a person on how to utilize the particular navigation unit.

In order to overcome the complexities of indicating position under emergency situations in which panic is likely to occur, the Coast Guard has in the past reviewed a system in which a transponder tethered to a vessel is utilized to receive the hyperbolic navigation signals and to retransmit them to Coast Guard reception points where they are processed so that the location of the vessel can be ascertained. Typically these devices are of a low power variety and are carried by a helium filled balloon or other such device as high above the vessel as possible while still being tethered thereto in order to provide for increased range and reliability necessary in order to locate the vessel. Unfortunately, either due to cost or due to problems with such low level retransmitted signals, such a system is not presently in place and it is only with difficulty that the Coast Guard or other agency can locate a vessel in distress.

While it has long been possible to locate vessels in distress through the utilization of emergency locators beacons and triangulation, success with triangulation in terms of the personnel utilized for such purposes, as well as the variability of the equipment involved, make such triangulation systems unreliable. A further reason for the unreliability in such systems is the variable signal strength of the transmitters utilized on the vessels in distress.

While it is indeed true, that individuals can turn on their loran or other navigation units and read the latitude and longitude directly into a microphone coupled to a transmitter such as a VHF transmitter, under panic situations this is not always possible. Moreover due to the complexity of the front panels of most hyperbolic or satellite navigation units an uninitiated person cannot adequately even turn on the unit much less obtain the required reading to be able to transmit it by radio.

It is therefore an object of this invention to provide a more foolproof method of providing the location of a vessel in distress to the appropriate authorities in an automatic fashion which can be simply utilized and which utilizes existing emergency frequencies.

It is also an object of this invention to provide a system which is disabled by the appropriate authority through the utilization of a specialized channel once the information as to location has been ascertained or once the vessel has been physically sighted.

A further object of the present invention is to provide that the transmission of emergency information does not impair the operation of the navigation receiver either through interference or inadvertent overload.

SUMMARY OF THE INVENTION

In order to provide for more reliable emergency location, an omega, loran or satellite navigation receiver is provided with a speech synthesizer coupled to its latitude/longitude output which is in turn coupled to a transmitter which transmits the latitude and longitude along with a "mayday" indication on an emergency channel when an emergency button is depressed on the unit. The emergency button turns the power on for the navigation unit and bypasses all functions except those relating to the production of a lat./lon. signal. The emergency button also activates the transmitter and the synthesizer after determining that the navigation unit has obtained lock. Upon the obtaining of lock a repeat timer produces repeated dump pulses to the speech synthesizer which modulates the transmitter to transmit the "mayday" indication plus an indication of the latitutde and longitude of the vessel. As an option, the vessel name, type, color or other information may be entered into a memory for the speech synthesizer so that the identity of the vessel and its type and color may be ascertained. If time, a code indicating the type of trouble may be entered, eg. boat sinking, medical emergency, out of fuel etc. As an additional feature the unit is provided with a receiver tuned to a special channel utilized by the Coast Guard or other authorities to disable the transmitter remotely. A manual disable from within the vessel is also provided. In one embodiment the same antenna is utilized for the navigation unit, the transmitter and the receiver, whereas in another embodiment the navigation unit is placed in stand-by during the transmit cycle so that its latitude and longitude indication are not affected by the transmission.

DESCRIPTION OF THE DRAWING

These and other features of the above mentioned invention are more thoroughly described in the Detailed Description taken in conjunction with the sole drawing of which the sole drawing is a block diagram of the subject system illustrating the utilization of a navigation unit in combination with a speech synthesizer and a transmitter for transmitting latitude and longitude upon the actuation of the unit by an emergency button.

DETAILED DESCRIPTION

Referring now to FIG. 1, a navigational unit 10 which may in the usual instance be an omega, a loran or a sateelite navigation unit, has as an output thereof the latitude and longitude of the location of the vessel on which the navigation unit is mounted. In the usual case this unit, which may be a stand alone unit, has a number of front panel switches in order to provide for instance way points, steering information and other types of information which are not necessary or desirable for one to know during an emergency situation. the latitude and longitude is provided by the navigation unit after the navigation unit has acquired the appropriate signals and is locked on to the signals such that the information being provided from it is said to be "locked" or accurate. In the case of hyperbolic navigation systems such as omega and loran, the first information acquired is the so called time difference between a pair of stations, or a T.D. While it is possible that the T.Ds. qualify as geometric coordinates for the unit, through the utilization of Cambell's routine these time differences are readily converted into latitude and longitude and, while the subject system is not limited to latitude and longitude indications being broadcast, it is these which are most readily recognized by all seamen.

The output of the navigation unit is applied to a speech synthesizer 12 which has an internal read only memory (ROM) in which is stored both the term "mayday" and a large number of latitudes and longitudes which, when accessed by the output of the navigation unit cause the speech synthesizer portion of the unit to read out first a "mayday" signal followed by the geometric coordinates to a transmitter 14 coupled to an antenna 16 via a T/R switch 17 under the control of a dump signal to be described hereinafter. The T/R switch is normally in the receive position when the unit is not transmitting. The transmission to a remote location of the latitude and longitude is read out from the navigational unit through the synthesizer to the transmitter which is either keyed on with the pushing of an emergency button 20 or is keyed on just prior to the time that the speech synthesizer provides an audio output which modulates the audio section of transmitter 14. The emergency channel, in one embodiment, is the VHF channel 16.

The particular navigational coordinates which are transmitted by speech via transmitter 14, to be most useful should be the latitude and longitude.

However any other geometrical coordinates such as time differences can be annunicated and transmitted via transmitter 14, although this type of nomenclature may be unfamiliar to launching search and rescue missions. Various navigational units have as outputs thereof digitally encoded information which is easily converted into speech by conventional speech synthesizers which generate audio signals in response to a dump pulse provided to a speech synthesizer.

As will be appreciated, the navigation unit is coupled to an antenna 18 utilized for the purpose of receiving either hyperbolic navigation signals or satellite navigation signals for the purpose of locating the vessel.

An emergency button 20 is provided that activates a unit 21 which powers on the navigational unit and bypasses all functions except the latitude/longitude function. Alternatively, if the navigational unit is already on, this button places the navigational unit in the lat./lon. mode. It will be appreciated that this bypass is important in some instances due to the complexity of the front planel of the navigational unit, which complexity is so enormous that even trained personnel are confused in times of stress caused by emergency situations. The emergency button also activates a synthesizer activation unit 24, which activates synthesizer 12 after lock has been achieved at the navigational unit. That lock is achieved is provided over line 22 to unit 24 for this purpose. The output of unit 24 is applied to repeat timer 26 which repeatedly generates a dump pulse over line 28 through a disable circuit 30 to speech synthesizer 12. Optionally speech synthesizer 12 may be provided with the vessel name, type and color or other information entered from a memory 32 having keypad 34 as its input. This information is provided after the mayday indication and the longitude/latitude indication and is transmitted periodically under the control of the repeat timer 26. If required, transmitter 14, when transmitting, produces a signal over line 40 which blanks the navigational receiver so as to prevent affecting the reading of the navigational receiver through the transmission of radio frequency energy from antenna 16.

In one embodiment a receiver 42 utilizes antenna 16 to receive disable signals sent over a special channel via the appropriate authority to disable the unit when, for instance, the vessel in distress is in sight. This will also permit the Coast Guard to disable any units which have accidently been turned on. Alternatively, a manual disable switch or button 46 may be utilized to disable the speech synthesizer portion of the unit as well as the keying of the transmitter. Should the operator of the vessel want to reenable the circuit pressing of the emergency button reenables the system by transmitting a signal over line 48 to inactivate the disable circuit 30 so that the emergency function can be again initiated.

Having above indicated a preferred embodiment of the present invention, it will occur to those skilled in the art that modifications and alternatives can be practiced within the spirit of the invention.

It is accordingly intended to define the scope of the invention only as indicated in the following claim:.

1. Apparatus adapted to be placed on board a vessel or vehicle so as to be easily usable in an emergency situation by persons on said vessel or vehicle to signal its geopgraphical coordinates by automatically signaling via modulation of an RF signal with a human voice the position of said vessel or vehicle comprising:

a navigation unit adapted to be used on said vessel or vehicle and having as an output the geographical coordinates of said vessel or vehicle;

means connected to said navigation unit including an easily-identified emergency switch means which overrides all except necessary emergency location operations of said navigation unit for activating said navigation unit to generate said coordinates;

means including a speech synthesizer for converting said generated coordinates into an electromagnetic signal representative of human speech;

means including an RF transmitter for broadcasting an electromagnetic signal modulated by said signal representative of human speech on an emergency channel, said broadcast signal adapted to be received by conventional remotely-located receiving means having voice demodulation means and means for reproducing human speech, such that the coordinates of said vessel or vehicle are broadcast by human voice on a modulated RF signal from said vessel or vehicle in a manner intelligible by human beings at said remotely located receiving means; and, means responsive to receipt of a predetermined electromagnetic signal transmitted from a location remote from that of said vessel for disabling the transmission of said broadcast signal on said emergency channel, such that the signal broadcast from said vessel or vehicle can be remotely disabled.

2. The apparatus of claim 1 wherein said activating means bypasses all functions of said navigational unit not used for generating said coordinates.

3. The apparatus of claim 1 and further including means for activating said speech converting means and said transmitter means in a periodic fashion to provide a repeated coordinate update.

4. The apparatus of claim 1 and further including means for inactivating said disabling means.

5. The apparatus of claim 1 and further including means for inputting additional information to be transmitted into the speech ROM of said coordinate converting means, and for causing said information to be read out of said speech ROM after or before the readout of said coordinates.

6. The apparatus of claim 5 wherein said inputting means includes a keypad.

7. The apparatus of claim 1 wherein said coordinates are in the form of latitude and longitude.

8. The apparatus of claim 1 wherein said activating means includes a single identifiable switch, thereby eliminating the necessity of familiarity with any other switches on said navigation unit.

9. The apparatus of claim 1 wherein said navigation unit is a hyperbolic navigation unit.

10. The apparatus of claim 1 wherein said navigation unit is a satellite navigation unit.

11. The apparatus of claim 1 and further including an antenna and wherein said navigation unit and transmitter means share said antenna.

12. The apparatus of claim 11 wherein said apparatus includes a receiver and disabling means coupled thereto for inactivating said speech synthesizer.

13. The apparatus of claim 1 wherein said navigation unit is protected against radiation from said electromagnetic signal.

14. The apparatus of claim 13 wherein said protection is applied when said transmitter is keyed.

15. Apparatus adapted to be placed on board a vessel or vehicle so as to be easily usable in an emergency situation by persons on said vessel or vehicle to signal its geographical coordinates by automatically signalling by a modulation of an RF signal with a human voice the position of said vessel or vehicle comprising:

a navigation unit adapted to be used on said vessel or vehicle and having as an output at least two geographical coordinates of said vessel or vehicle;

means connected to said navigation unit including easily identified emergency switch means which overrides all except necessary emergency location operations of said navigation unit for activation of said navigation unit to generate said coordinates;

means including a speech synthesizer for converting said generated coordinates into an electromagnetic signal representative of human speech; and, means including an RF transmitter for broadcasting an electromagnetic signal modulated by said signal representative of human speech, said broadcast signal adapted to be received by conventional remotely located receiving means having voice demodulation means and means for reproducing human speech, such that the coordinates of said vessel or vehicle are broadcast by human voice on an modulated RF signal from said vessel or vehicle in a manner intelligible by human beings at said remotely located receiving means, whereby said navigation unit is transferred to an emergency mode by actuation by an individual on the vessel or vehicle on which it is carried, whereby the emergency function can be activated by persons not knowledgeable in the operation or function of either the navigation unit or the speech synthesizing or speech transmission means.

16. Apparatus adapted to be placed on board a vessel or vehicle so as to be easily usable in an emergency situation by persons on said vessel or vehicle to signal its geographical coordinates by automatically signalling by a modulation of an RF signal with a human voice the position of said vessel or vehicle comprising:

a navigation unit adapted to be used on said vessel or vehicle and having as an output at least two geographical coordinates of said vessel or vehicle;

means for activating said navigational unit to generate said coordinates;

means including a speech synthesizer for converting said generated coordinates into an electromagnetic signal representative of human speech; and, means including an RF transmitter for broadcasting an electromagnetic signal modulated by said signal representative of human speech, said broadcast signal adapted to be received by conventional remotely located receiving means having voice demodulation means and means for reproducing human speech, such that the coordinates of said vessel or vehicle are broadcast by human voice on a modulated RF signal from said vessel or vehicle in a manner intelligible by human beings at said remotely located receiving means.

17. Apparatus usable at a first location to signal the geographical coordinates of said first location by automatically signalling by a modulation of an RF signal with a human voice the position of said first location comprising:

a navigation unit adapted to be used at said first location and having as an output at least two geographical coordinates of said first location;

means for activating said navigation unit to generate said coordinates;

means including a speech synthesizer for converting said generated coorcinates into an electromagnetic signal representative of human speech; and, means including an RF transmitter for broadcasting an electromagnetic signal modulated by said signal representative of human speech, said broadcast signal adapted to be received by conventional remotely located receiving means having voice demodulation means and means for reproducing human speech, such that the coordinates of said first location are broadcast by human voice on a modulated RF signal from said first location in a manner intelligible by human beings at said remotely located receiving means.

* * * * *